(12) United States Patent
Hall

(10) Patent No.: US 6,253,906 B1
(45) Date of Patent: Jul. 3, 2001

(54) SEQUENTIAL RELEASE CONTROL FOR A ZONED CONVEYOR SYSTEM

(75) Inventor: David V. Hall, Cookeville, TN (US)

(73) Assignee: Milwaukee Electronics Corporation, Milwaukee, WI (US)

( * ) Notice: Subject to any disclaimer, the term of this patent is extended or adjusted under 35 U.S.C. 154(b) by 0 days.

(21) Appl. No.: 09/080,514

(22) Filed: May 18, 1998

(51) Int. Cl.[7] ..................................................... B65G 47/26
(52) U.S. Cl. .......................................... 198/460.1; 198/575
(58) Field of Search ............................. 198/460.1, 460.3, 198/781.06, 575

(56) References Cited

U.S. PATENT DOCUMENTS

| | | |
|---|---|---|
| 2,510,163 * | 6/1950 | Wood .................................... 198/575 |
| 2,586,782 * | 2/1952 | Buckeridge ........................... 198/575 |
| 3,075,630 | 1/1963 | Fisk . |
| 3,485,339 | 12/1969 | Miller et al. . |
| 3,605,986 | 9/1971 | Navin . |
| 3,817,368 | 6/1974 | Wentz et al. . |
| 3,960,262 | 6/1976 | Henig . |
| 3,982,625 | 9/1976 | Wentz et al. . |
| 4,231,465 | 11/1980 | Bourgeois . |
| 4,281,756 | 8/1981 | Bruno . |
| 4,629,058 | 12/1986 | Reissmann et al. . |
| 4,640,408 | 2/1987 | Eaves . |
| 4,653,630 | 3/1987 | Bravin . |
| 4,717,013 | 1/1988 | Reissmann et al. . |
| 4,815,582 | 3/1989 | Canziani . |
| 4,921,092 | 5/1990 | Crawford et al. . |
| 4,962,844 | 10/1990 | Francioni . |
| 5,038,915 | 8/1991 | Delsanto . |
| 5,058,727 | 10/1991 | Jahns et al. . |
| 5,082,103 | 1/1992 | Ross et al. . |
| 5,137,139 | 8/1992 | Rusello . |
| 5,186,038 | 2/1993 | Munro . |
| 5,228,558 | 7/1993 | Hall . |
| 5,285,887 | 2/1994 | Hall . |
| 5,318,167 | 6/1994 | Bronson et al. . |
| 5,341,916 | 8/1994 | Doane et al. . |
| 5,358,464 | 10/1994 | Funk et al. . |
| 5,582,286 * | 12/1996 | Kalm et al. ...................... 198/781.06 |
| 5,862,907 * | 1/1999 | Taylor ............................. 198/781.06 |

* cited by examiner

*Primary Examiner*—Joseph E. Valenza
(74) *Attorney, Agent, or Firm*—Andrus, Sceales, Starke & Sawall, LLP

(57) ABSTRACT

An accumulating conveyor system for transporting a series of loads includes a series of conveyor zones, including at least an upstream conveyor zone and a downstream conveyor zone. Each conveyor zone includes a drive arrangement for operating the conveyor zone to advance loads therealong. A control is interconnected with each drive arrangement. The control is operable to sequentially initiate operation of adjacent conveyor zones by delaying initiation of operation of an upstream conveyor zone for a predetermined time period after initiation of operation of a downstream conveyor zone. In this manner, operation of a series of adjacent conveyor zones is initiated in a sequential or wave-type manner, which avoids thrust loading of the conveyor system and minimizes electrical surges which otherwise would occur if operation of all zones were initiated simultaneously. Each zone includes a sensor at its downstream end, and, when it is desired to stop operation of the conveyor zones to maintain loads stationary thereon, operation is suspended when the leading edge of each load reaches the downstream sensor of the conveyor zone. In this manner, the adjacent zones also stop operation in a sequential manner since the spacing between adjacent loads increases upon sequential release of the loads at start-up.

9 Claims, 3 Drawing Sheets

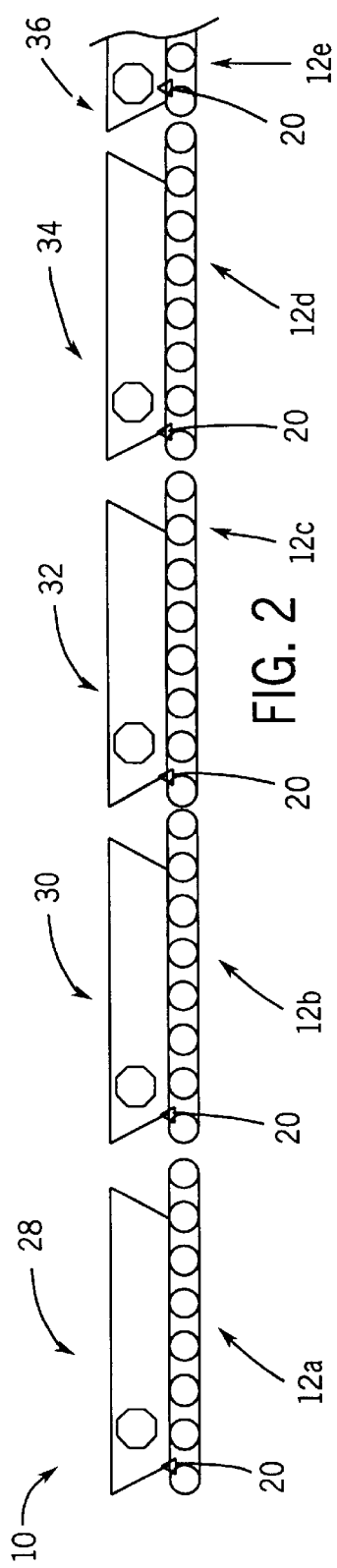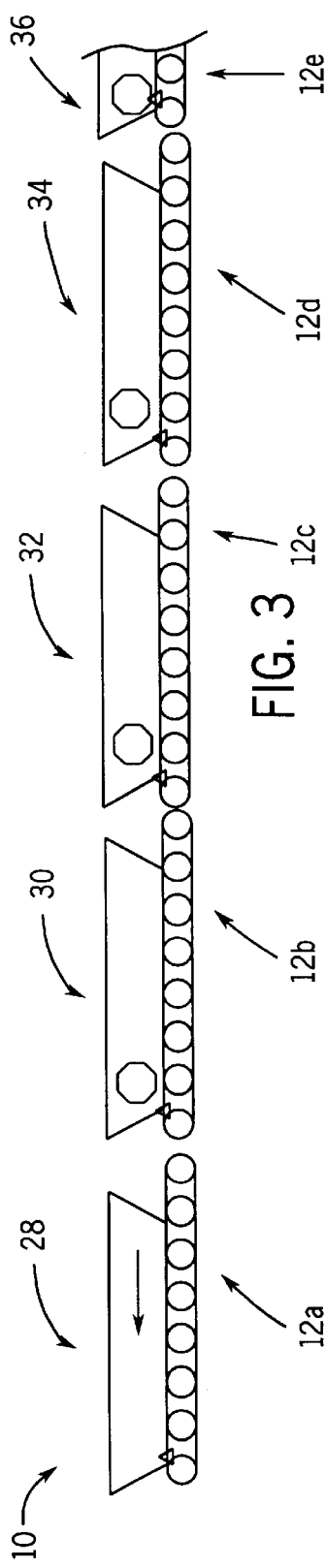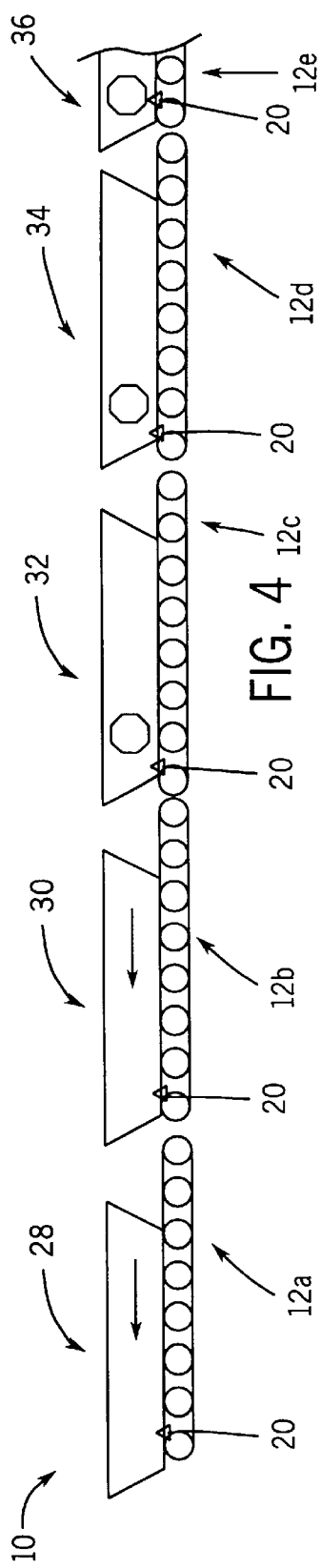

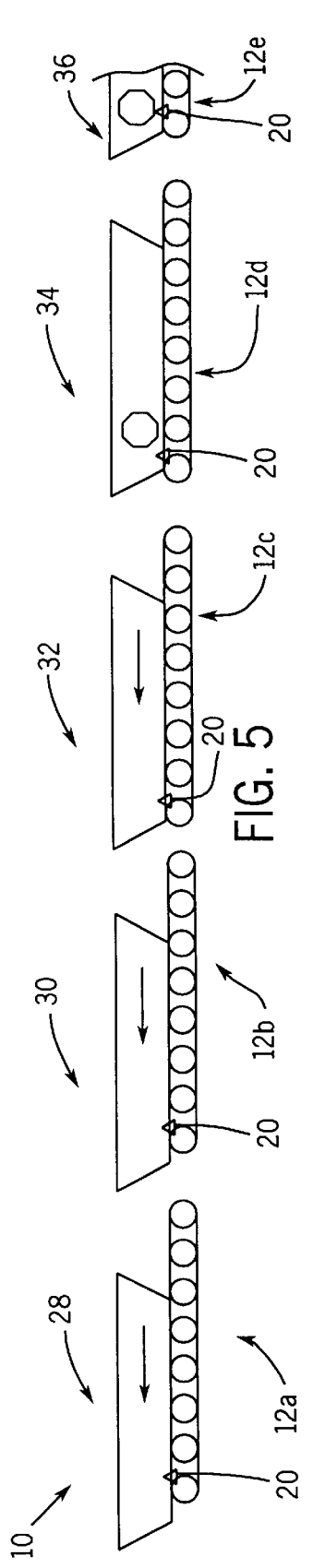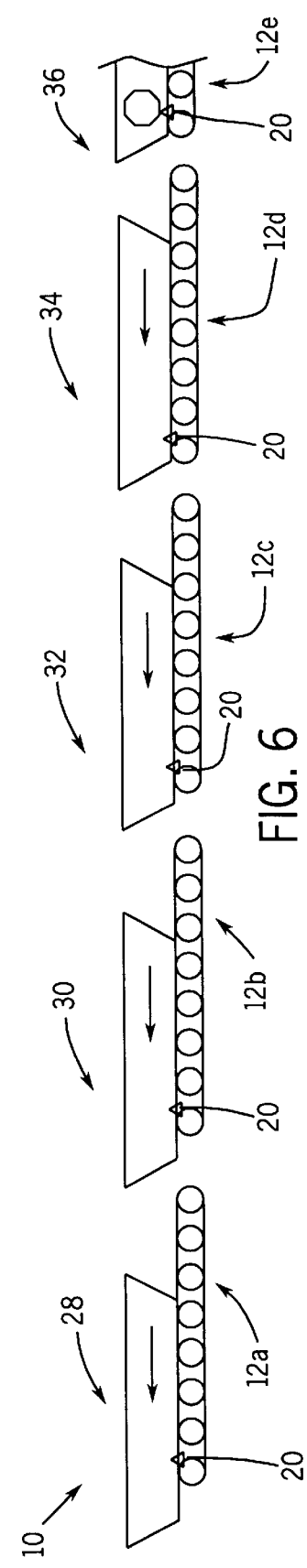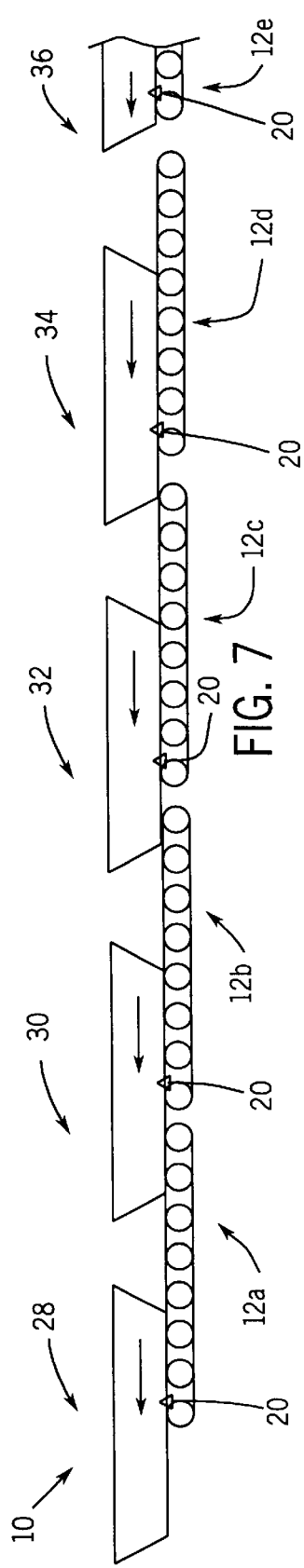

SEQUENTIAL RELEASE CONTROL FOR A ZONED CONVEYOR SYSTEM

BACKGROUND AND SUMMARY OF THE INVENTION

This invention relates to accumulating conveyors, and more particularly to a control system for an accumulating conveyor which is operable to sequentially initiate operation of adjacent conveyor zones.

An accumulating conveyor generally includes a series of zones which can be selectively controlled to allow articles being conveyed to accumulate in a selected area of the conveyor. Examples of control systems for providing certain functions of an accumulating conveyor are disclosed in Hall U.S. Pat. No. 5,255,558 issued Jul. 20, 1993 and Hall U.S. Pat. No. 5,285,887 issued Feb. 15, 1994.

Methods for operating accumulating conveyors have been well established over the years. One such method is known as singulated release, which controls the conveyor zones such that a load is discharged from one zone only when the immediately adjacent downstream zone is empty. Singulated release control is generally used to fill accumulating conveyors and to operate as a normal transport mode. This type of control is a very straight forward approach which can be accomplished using air logic, mechanical switches, combinations of clutches and brakes, or individually powered conveyor sections. Another conveyor control method is known as train release, which is operable to run multiple zones simultaneously regardless of whether or not there is a load on the zone. Train release is typically used near the discharge end of an accumulating conveyor to provide a large quantity of objects in rapid succession.

In the train release mode of operation, discharge of a load from the downstream end of the system can result in simultaneous start-up of all zones upstream therefrom. In some installations, such as in a suspended conveyor system, this simultaneous start-up of all conveyor zones may result in a mechanical resonance of the conveyor zones, resulting in the potential for mechanical damage to the structure of the conveyor as well as other problems. Further, simultaneous start-up of all conveyor zones results in a significant power surge on the electrical supply system. In addition, simultaneous start-up of all conveyor zones results in simultaneous stopping of all zones when the conveyor system initiates accumulation, which again can result in mechanical resonance of the system.

It is an object of the present invention to eliminate the potential for resonance in an accumulating conveyor system upon start-up and stopping of the conveyor zones. It is a further object of the invention to provide such a conveyor control which alleviates the potential for a sudden power drain on the electrical system for the accumulating conveyor upon start-up of the conveyor zones. Another object of the invention is to provide such a conveyor control which is relatively simple in its operation and easy to implement for use in conventional conveyor control systems.

In accordance with the invention, a conveyor system for transporting a series of loads includes a series of conveyor zones which includes at least an upstream conveyor zone and a downstream conveyor zone. A drive arrangement is interconnected with each conveyor zone for operating each conveyor zone to advance loads along the conveyor system. The invention contemplates a control arrangement interconnected with each drive arrangement, with the control arrangement being operable to stop operation of both the upstream and downstream conveyor zones to maintain stationary any loads carried by the upstream and downstream conveyor zones, to accumulate loads thereon. The control arrangement is operable to sequentially resume operation of the upstream and downstream conveyor zones by first initiating operation of the downstream conveyor zone and subsequently initiating operation of the upstream conveyor zone after a predetermined time delay from initiation of operation of the downstream conveyor zone. In this manner, the conveyor zones are started up sequentially, to effect a sequential or "wave" release of loads carried by the conveyor zones. In a preferred form, the control arrangement includes an individual control module for each of the upstream and downstream conveyor zones. The control modules of the upstream and downstream conveyor zones are interconnected with each other such that the control module of the upstream conveyor zone continuously monitors the status of the control module of the downstream conveyor zone. The control module of the upstream conveyor zone is operable to initiate operation of the upstream conveyor zone subsequent to operation of the downstream conveyor zone by receiving a permission signal from the control module of the downstream conveyor zone after the predetermined time period has lapsed from initiation of operation of the downstream conveyor zone. The upstream conveyor zone may be one of a series of conveyor zones upstream of the downstream conveyor zone. The control arrangement is interconnected with the drive arrangement of each of the upstream conveyor zones, to sequentially initiate operation of each of the upstream conveyor zones after a predetermined time delay from initiation of operation of the conveyor zone downstream therefrom.

The invention further contemplates a method of controlling a conveyor having adjacent upstream and downstream conveyor zones for advancing a series of loads, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIGS. 2–7 are schematic side elevation views of a series of adjacent zones as shown in FIG. 1, showing advancement of a series of loads thereon and control of the conveyor zones in accordance with the present invention.

DETAILED DESCRIPTION OF THE INVENTION

Figure 1:
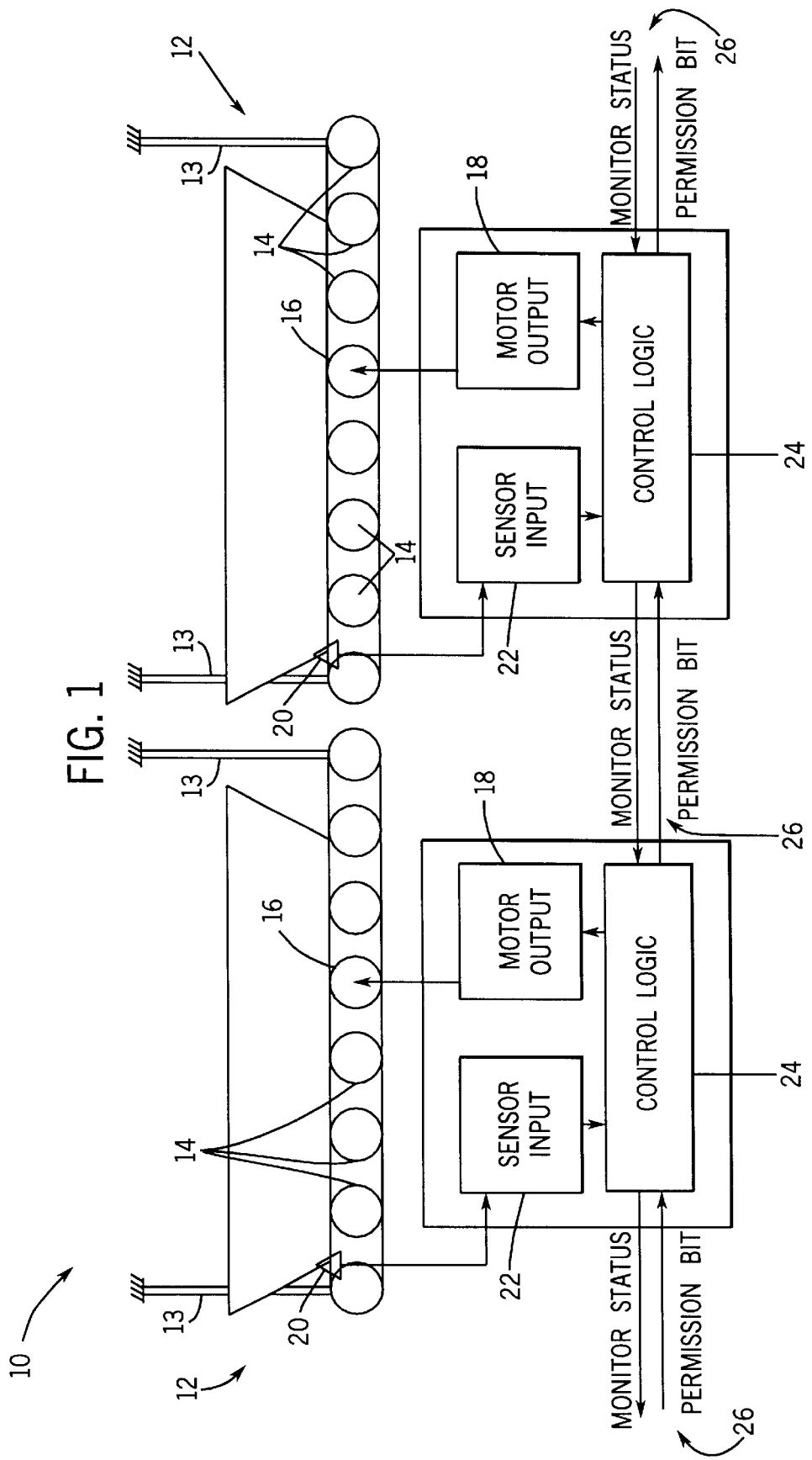
FIG. 1 is a schematic side elevation view showing adjacent zones of an accumulating conveyor and a control and drive arrangement for each zone, for controlling operation of the conveyor in accordance with the present invention.

Referring to FIG. 1, an accumulating conveyor 10 includes a series of adjacent suspended conveyor zones, each of which is shown at 12. Each conveyor zone 12 is suspended from a pair of supports, 13 and includes a conveyor frame having side rails in accordance with conventional construction, and a series of idler rollers 14 rotatably mounted between the side rails. Rollers 14 collectively define a load carrying surface for transporting a load from an upstream end of each zone 12 to a downstream end.

Each conveyor zone 12 further includes a drive roller 16 which is drivingly interconnected with each idler roller 14, typically by a series of belts in a manner as is known. In this manner, rotation of drive roller 16 results in simultaneous rotation of all idler rollers 14 in each zone 12.

In a preferred embodiment, each drive roller 16 includes a DC motor and gear assembly which are contained within the roller tube. This type of drive roller is known to those skilled in the art, and may representatively be a drive roller as described in U.S. Pat. No. 5,088,596, the disclosure of which is hereby incorporated by reference. The motor incorporated within drive roller 16 includes an output shown schematically at 18, which is interconnected with drive roller 16 in a manner as is known so as to cause rotation of drive roller 16 in response to operation of the motor contained within roller 16.

Each zone 12 further includes a sensor 20 located adjacent its downstream end. Sensors 20 may be in the form of conventional photocells, each of which includes a sensor input 22 interconnected with sensor 20. A control module 24 is provided for each zone 12, and each sensor input 22 is interconnected with the zone control module 24 for providing an input from sensor 20 to control module 24. In addition, control module 24 is interconnected with motor output 18 for controlling operation of drive roller 16, again in a manner as is known.

Representatively, control module 24 may be in the form of a programmable logic controller such as is available from the Aromat Division of Matsushita Electric under its designation FPM, which can be programmed in accordance with conventional technology to control operation of motor output 18 in the manner explained hereafter, as well as other functions of conveyor zone 12. A communication link 26 extends between and interconnects adjacent control modules 24.

In a manner as is known, a series of conveyor zones 12 are placed adjacent each other in an end-to-end relationship so as to define a conveyor assembly for transporting a series of loads. A portion of such a conveyor assembly is illustrated in FIGS. 2–7. The adjacent conveyor zones illustrated in FIGS. 2–7 are constructed as shown and described with respect to FIG. 1, and the zones are denoted 12a, 12b, 12c, 12d and 12e, with zone 12a being the most downstream conveyor zone.

Referring to FIGS. 2–7, a series of loads shown at 28, 30, 32, 34 and 36 are carried by zones 12a–12e, respectively, of conveyor 10. FIGS. 2 illustrates conveyor zones 12a–12e stopped in response to control module 24 of each zone, so as to maintain loads 28–36 stationary, typically in response to zones 12a–12e receiving an accumulate signal from a zone downstream therefrom. When it is desired to resume operation of conveyor system 10, control module 24 of zone 12a provides a signal to its motor output 18 to operate zone 12a and to advance load 28 thereon, as shown in FIG. 3. Operation of zone 12a continues for a predetermined time period while operation of zones 12b–12e is suspended. Representatively, zone 12a may operate for a relatively short time period such as one tenth of a second while operation of upstream zones 12b–12e is suspended.

Once the predetermined time period for operation of zone 12a has lapsed, control module 24 of zone 12a sends a permission bit over communication link 26 to control module 24 of zone 12b, and control module 24 of zone 12b then initiates operation of zone 12b to advance load 30 thereon, as shown in FIG. 4. Operation of zones 12a and 12b is continued so as to simultaneously advance both loads 28 and 30, and again operation of upstream zones 12c–12e is suspended for a predetermined time period subsequent to initiation of operation of zone 12b, which is preferably the same time period during which operation of zone 12b is suspended after initiation of operation of zone 12a. Once the predetermined time period has lapsed, the control module 24 of zone 12b sends a permission bit over communication link 26 to control module 24 of zone 12c, and control module 24 of zone 12c then initiates operation of zone 12c to advance load 32 thereon as shown in FIG. 5. Operation of zones 12a–12c is continued so as to simultaneously advance loads 28–32, respectively, and operation of upstream zones 12d and 12e is suspended for a predetermined time period subsequent to initiation of operation of zone 12c, which again is preferably the same time period as set forth previously. Once the predetermined time period has lapsed, the control module 24 of zone 12c sends a permission bit over communication link 26 to control module 24 of zone 12d, and control module 24 of zone 12d initiates operation of zone 12d to advance load 34 thereon as shown in FIG. 6. Operation of all downstream zones 12a–12c continues in order to advance loads 12a–12c, respectively, thereon, such that loads 12a–12d are advanced simultaneously as shown in FIG. 12. Again, after expiration of a predetermined time delay subsequent to operation of zone 12d, control module 24 of zone 12d sends a permission bit over communication link 26 to control module 24 of zone 12e, enabling initiation of operation of zone 12e to advance load 36 thereon, as shown in FIG. 7. Operation of downstream zones 12a–12d continues, such that loads 12a–12e are advanced simultaneously as shown in FIG. 7.

As noted previously, each control module 24 of a conveyor zone 12 continuously monitors the status of each control module 24 downstream therefrom through communication link 26. When the downstream control module 24 sends a permission bit over communication link 26 to the upstream control module 24, the upstream control module 24 operates the zone motor output 18 to impart rotation to drive roller 16 and to thereby transport the load carried by the upstream conveyor zone 12. If the zone of interest is in the accumulate mode, the control module 24 of the downstream conveyor zone 12 does not communicate a permission bit over communication link 26, and operation of the upstream conveyor zone 12 is suspended until a permission bit is received.

If loads are stopped at the downstream end of each conveyor zone as shown in FIG. 2, such that the leading edge of each load is positioned over the zone downstream sensor 20, an input from sensor 20 through sensor 22 can be utilized by control module 24 to indicate that advancement of the load has initiated and to thereby communicate the permission bit to the control module 24 of the upstream zone after initiation of movement of the downstream load has occurred. In a preferred form, however, each control module 24 automatically delays sending the permission bit over communication link 26 to the control module 24 of the upstream zone after initiation of operation of the downstream zone, to sequentially initiate operation of the upstream conveyor zones regardless of the position of each load on the zones.

The above operation of conveyor system 10 functions to sequentially initiate operation of zones 12a–12e, and any zones upstream therefrom, once operation of the downstream zone 12a is initiated. This sequential start-up of conveyor zone operation ensures that all zones do not initiate operation simultaneously, which otherwise could result in a power drain on the electrical system and inducement of resonant or shock loading on the structure of conveyor system 10. While the slight delay in start-up slightly decreases throughput of conveyor system 10, the delay is minimal and provides no significant effect on throughput. In addition, the delayed release of adjacent loads ensures the presence of a gap between each adjacent pair of loads, which can be advantageous for other operations on conveyor system 10 when it is necessary to ensure each zone carries a single load which is necessary for such operations as automated weighing, sorting, counting or packaging, or when it is desired to introduce packages into another part of the conveyor system, such as a vertical lift or the like.

When necessary to stop operation of conveyor system 10, or a portion thereof, each zone such as zones 12a–12e is stopped when the load supported thereby reaches downstream sensor 20. In this manner, the zone control module 24 positively detects the presence of the load on the zone when sensor 20 is blocked, and zone control module 24 stops motor output 18 to stop operation of the zone and to maintain the load stationary thereon, as illustrated in FIG. 2. Since the gap between adjacent loads increases as the loads are released as shown and described with respect to FIGS. 2–7, there is also a time delay when the conveyor zones 12 are stopped in order to maintain the loads stationary thereon, with the time delay being caused by the staggered or wave-type manner in which the leading edge of each load reaches the downstream sensor 20 of the zone on which the load is supported. In this manner, resonant or thrust loading of conveyor system 10 is again avoided by the sequential stopping in operation of the conveyor zones when in an accumulate mode.

The operation of zones 12, as described above, is carried out by software programmed into control module 24 of each zone 12, in a manner as is known to one skilled in the art.

Various alternatives and embodiments are contemplated as being within the scope of the following claims particularly pointing out and distinctly claiming the subject matter regarded as the invention.

I claim:

1. A conveyor system for transporting a series of loads, comprising:

a series of suspended conveyor zones including a downstream conveyor zone and a plurality of upstream conveyor zones;

a selectively operable drive arrangement interconnected with each conveyor zone for operating each conveyor zone to advance the loads along the conveyor system; and a control arrangement interconnected with each drive arrangement to reduce lateral inertial forces applied to the conveyor zones upon start-up of the drive arrangements of the conveyor zones which tend to cause swinging of the conveyor zones, wherein the control arrangement is operable to stop operation of the upstream and the downstream conveyor zones to maintain stationary any loads carried by the upstream and downstream conveyor zones, and to resume operation of the upstream and downstream conveyor zones by first initiating operation of the downstream conveyor zone, and subsequently sequentially controlling initiation of operation of each upstream conveyor zone, wherein the control arrangement is operable to initiate operation of one of the upstream conveyor zones subsequent to expiration of a controlled predetermined time period from initiation of operation of the conveyor zone downstream therefrom but before a load carried by the downstream conveyor zone has been discharged therefrom, so that operation of each conveyor zone is initiated in a controlled sequential timed manner in response to initiation of operation of the conveyor zone downstream therefrom.

2. The conveyor system of claim 1, wherein the control arrangement includes an individual control module for each of the upstream and downstream conveyor zones, wherein the control module of the upstream conveyor zones and the control module of the downstream conveyor zone are interconnected with each other such that the control module of each upstream conveyor zone continuously monitors the status of the control module of the conveyor zone downstream therefrom, and wherein the control module of each upstream conveyor zone is operable to initiate operation of the upstream conveyor zone subsequent to operation of the conveyor zone downstream therefrom by the downstream conveyor zone communicating a permission signal to the control module of the upstream conveyor zone after a predetermined time period has lapsed from initiation of operation of the downstream conveyor zone.

3. A method of controlling a conveyor having a suspended downstream conveyor zone and a series of suspended upstream conveyor zones for advancing a series of loads, comprising the steps of:

stopping operation of each suspended conveyor zone to maintain stationary any loads supported by the conveyor zone; and controlling operation of the conveyor zones to reduce lateral forces applied to the conveyor zones upon initiation of operation of the conveyor zones which tend to cause swinging of the conveyor zones, by sequentially initiating operation of the downstream conveyor zone and the upstream conveyor zones by first initiating operation of the downstream conveyor zone, and subsequently sequentially controlling initiation of operation of each upstream conveyor zone by initiating operation of one of the upstream conveyor zones subsequent to expiration of a controlled predetermined time period from initiation of operation of the conveyor zone downstream therefrom but before a load carried by the downstream conveyor zone has been discharged therefrom, wherein operation of each conveyor zones is initiated in a controlled sequential timed manner in response to initiation of operation of the conveyor zone downstream therefrom.

4. The method of claim 3, wherein the step of sequentially initiating operation of the conveyor zone is carried out by:

interconnecting a control module with each conveyor zone which is operable to control operation of each conveyor zone;

interconnecting the control module of each conveyor zone with the control module of each conveyor zone upstream therefrom;

operating the control module of each conveyor zone so as to continuously monitor the status of the conveyor zone downstream therefrom; and communicating a signal from the control module of the downstream conveyor zone to the control module of the conveyor zone upstream therefrom after expiration of a predetermined time period subsequent to initiation of operation of the downstream conveyor zone but before a load carried by the downstream conveyor zone has been discharged therefrom, wherein the control module of the upstream conveyor zone is responsive to the signal to initiate operation of the upstream conveyor zone.

5. The conveyor system of claim 1, wherein the control arrangement is operable to stop operation of each conveyor zone when the load supported by each conveyor zone attains a predetermined position on the conveyor zone.

6. The conveyor system of claim 5, wherein each conveyor zone includes a sensor located toward a downstream end defined by the conveyor zone, and wherein the sensor is interconnected with the control arrangement for providing a signal to the control arrangement indicative that the load has attained a predetermined position on the conveyor zone toward the downstream end of the conveyor zone, so that the control arrangement is operable to stop operation of the conveyor zone when the load is located toward the downstream end of the conveyor zone.

7. The method of claim 3, wherein the step of stopping operation of each conveyor zone is carried out by stopping operation of the conveyor zone when a load supported by the conveyor zone attains a predetermined position on the conveyor zone.

8. The method of claim 7, wherein the step of stopping operation of each conveyor zone is carried out by providing a signal to a control module associated with each conveyor zone in response to the load reaching the predetermined position on the conveyor zone.

9. The method of claim 8, wherein the step of providing a signal to the control module is carried out by positioning a sensor adjacent a downstream end defined by the conveyor zone, wherein the sensor provides a signal to the control module when the load attains a predetermined position adjacent the downstream end of the conveyor zone to stop operation of the conveyor zone.

* * * * *